US007638784B2

(12) United States Patent
Fox et al.

(10) Patent No.: US 7,638,784 B2

(45) Date of Patent: Dec. 29, 2009

(54) RADIATION PROTECTION SYSTEM

(75) Inventors: Mark A. Fox, Leesburg, IN (US); James Goldstein, Bloomfield Hills, MI (US)

(73) Assignee: ECO Cath-Lab Systems, Inc., Woods Cross, UT (US)

( * ) Notice: Subject to any disclaimer, the term of this patent is extended or adjusted under 35 U.S.C. 154(b) by 226 days.

(21) Appl. No.: 11/684,114

(22) Filed: Mar. 9, 2007

(65) Prior Publication Data

US 2008/0073593 A1 Mar. 27, 2008

Related U.S. Application Data

(60) Provisional application No. 60/781,262, filed on Mar. 10, 2006.

(51) Int. Cl.

| | |
|---|---|
| ***G21F 3/02*** | (2006.01) |
| ***G21F 3/04*** | (2006.01) |
| ***G21F 7/00*** | (2006.01) |
| ***G21F 3/00*** | (2006.01) |
| ***G21F 1/00*** | (2006.01) |
| ***G21F 5/00*** | (2006.01) |
| ***G21K 1/00*** | (2006.01) |
| ***G21C 11/00*** | (2006.01) |
| ***G02B 5/00*** | (2006.01) |
| ***H01J 1/52*** | (2006.01) |
| ***H01J 3/00*** | (2006.01) |
| ***H01J 5/18*** | (2006.01) |
| ***H01J 29/46*** | (2006.01) |

(52) U.S. Cl. .............. 250/515.1; 250/505.1; 250/517.1; 250/519.1

(58) Field of Classification Search .............. 250/505.1, 250/515.1, 519.1, 517.1; 362/145, 147, 572, 362/422, 444, 404, 402, 403

See application file for complete search history.

(56) References Cited

U.S. PATENT DOCUMENTS

| | | | | |
|---|---|---|---|---|
| 4,074,141 | A * | 2/1978 | Bryant | 250/517.1 |
| 4,581,538 | A * | 4/1986 | Lenhart | 250/519.1 |
| 4,741,414 | A | 5/1988 | Claassen | |
| 4,975,817 | A * | 12/1990 | Reimers | 362/418 |
| 5,006,718 | A | 4/1991 | Lenhart | |
| 5,220,175 | A | 6/1993 | Cole | |
| 5,379,332 | A | 1/1995 | Jacobson | |
| 5,523,581 | A * | 6/1996 | Cadwalader | 250/519.1 |
| 5,881,470 | A * | 3/1999 | Hindman et al. | 33/503 |

(Continued)

OTHER PUBLICATIONS

International Searching Authority, International Search Report, Feb. 7, 2008 filed in connection with PCT/US07/06129.

*Primary Examiner*—David A Vanore
*Assistant Examiner*—Brooke Purinton
(74) *Attorney, Agent, or Firm*—Sonnenschein Nath & Rosenthal; Marcellus A. Chase

(57) ABSTRACT

A radiation protection system for protecting medical personnel from radiation being applied from a radiation source to a patient positioned on a table. The system includes a shield for positioning above the table having an inner frame sized and shaped for receiving the patient when the patient is positioned on the table, and a plurality of rods extending outward from the inner frame. The shield also has an outer frame surrounding the inner frame and connected to the plurality of rods, and a radiopaque flexible panel attached to the rods.

52 Claims, 10 Drawing Sheets

U.S. PATENT DOCUMENTS

| | | | | |
|---|---|---|---|---|
| 6,278,125 | B1 | 8/2001 | Belek | |
| 6,325,538 | B1 * | 12/2001 | Heesch | 250/515.1 |
| 6,609,692 | B1 * | 8/2003 | Muresan et al. | 362/148 |
| 6,623,146 | B2 * | 9/2003 | De Sisti et al. | 362/403 |
| 6,703,632 | B1 | 3/2004 | Macklis | |
| 2002/0046514 | A1 * | 4/2002 | Leung | 52/167.3 |
| 2002/0109107 | A1 * | 8/2002 | Goldstein | 250/505.1 |
| 2005/0173658 | A1 * | 8/2005 | Lemer | 250/515.1 |

* cited by examiner

RADIATION PROTECTION SYSTEM

CROSS-REFERENCE TO RELATED APPLICATIONS

This application claims priority from U.S. Provisional Patent Application No. 60/781,262 filed Mar. 10, 2006, which is hereby incorporated by reference.

BACKGROUND

This invention generally relates to radiation protection, and more particularly, to a radiation protection system for protecting medical personnel during radiographic procedures.

Radiographic equipment (e.g., x-ray equipment) used when performing a wide variety of medical procedures. For example, radiographic equipment is used by cardiologist when positioning heart catheters in patients. Many procedures such as these require medical personnel to be in direct contact with the patient, thereby preventing the personnel from being in a separate room and potentially exposing the medical personnel to radiation. For this reason, radiation shields are used during radiographic procedures to reduce radiation exposure. Radiation shields typically are constructed of materials such as lead that significantly reduce the transmission of radiation. For example, some shields include lead plates mounted on stands that may be adjusted to position the plates between the medical personnel and sources of radiation. Despite the use of these shields, medical personnel are still exposed to radiation. Exposure comes from many radiation sources other than the primary source. For example, a significant secondary radiation source is radiation transmitted through the patient to the medical personnel.

Cumulative long-term radiation exposure may cause adverse affects to medical personnel. Medical personnel performing radiographic procedures typically spend many hours over their careers performing such procedures. Medical personnel typically wear protective clothing, including a full lead apron, a thyroid collar and leaded glasses, to reduce radiation exposure while performing the procedures. However, wearing heavy lead protective clothing may have long-term adverse effects, including disabling spinal disorders. Although there are many prior art radiation protection systems for protecting and shielding medical personnel from radiation exposure, these systems often require medical personnel to wear protective clothing. Therefore, there is a need for systems that reduce or eliminate the need for wearing protective clothing to reduce or eliminate the effects of wearing the protective clothing.

BRIEF SUMMARY

The present invention relates to a radiation protection system for protecting medical personnel from radiation being applied from a radiation source to a patient positioned on a table. The system comprises a shield for positioning above the table. The shield includes an inner frame sized and shaped for receiving the patient when the patient is positioned on the table, and a plurality of rods extending outward from the inner frame. The shield also has an outer frame surrounding said inner frame and connected to said plurality of rods, and a radiopaque flexible panel attached to said rods.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
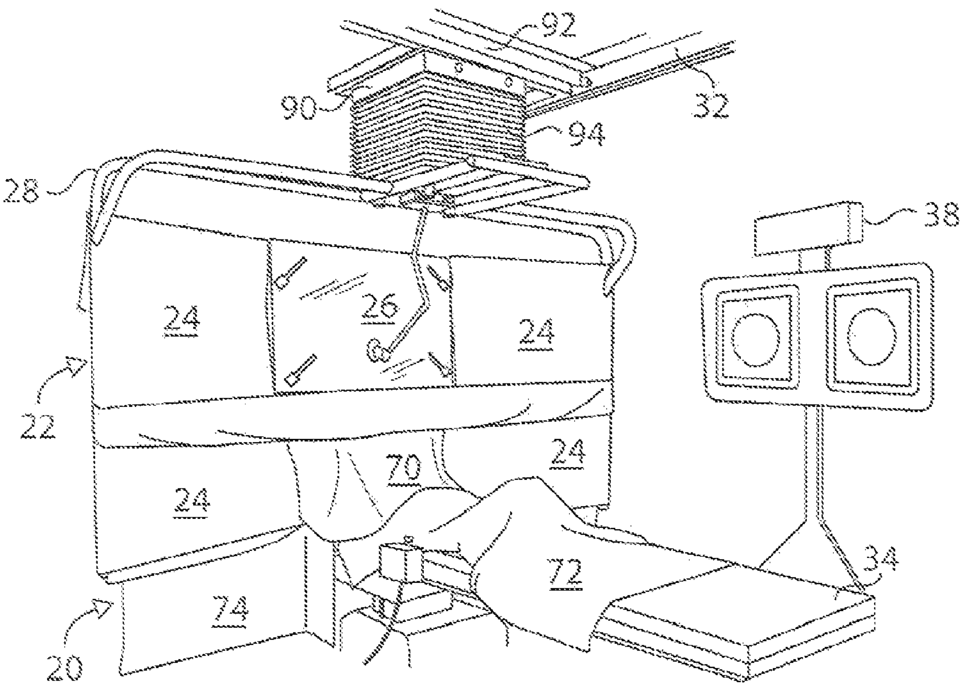
FIG. 1 is a perspective of a radiation protection system of a first embodiment of the present invention.

Referring now to the drawings and in particular FIG. 1; a radiation protection system of one embodiment of the present invention is designated in its entirety by the reference numeral 20. The system 20 comprises a shield, generally designated by 22, including flexible panels 24 and a visually transparent window 26, both of which have low radiation transmissivity, mounted on a frame 28. The shield 22 is suspended by a lift, generally designated by 30 in FIG. 8, mounted on an overhead track 32 positioned above a table 34, a radiation source 36 (FIG. 2), and radiographic monitoring equipment 38. The track 32, table 34, source 36 and equipment 38 are all conventional and will not be described in further detail.

Figure 2:
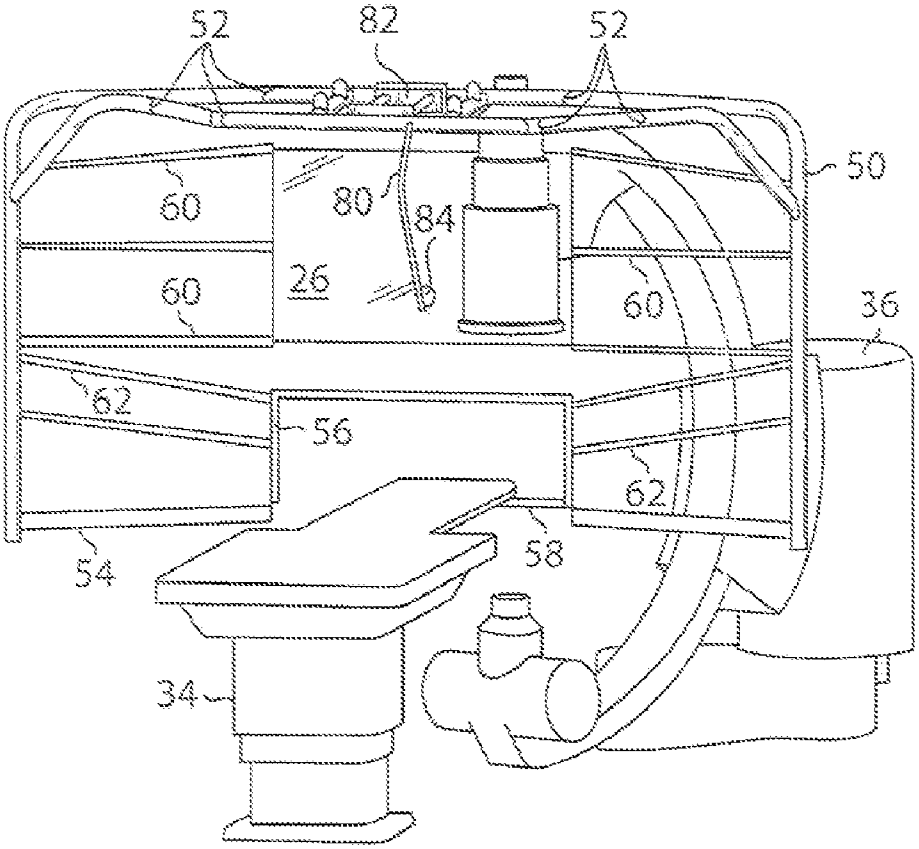
FIG. 2 is a perspective of a portion of a radiation protection system of a second embodiment of the present invention shown with panels removed.
Figure 3:
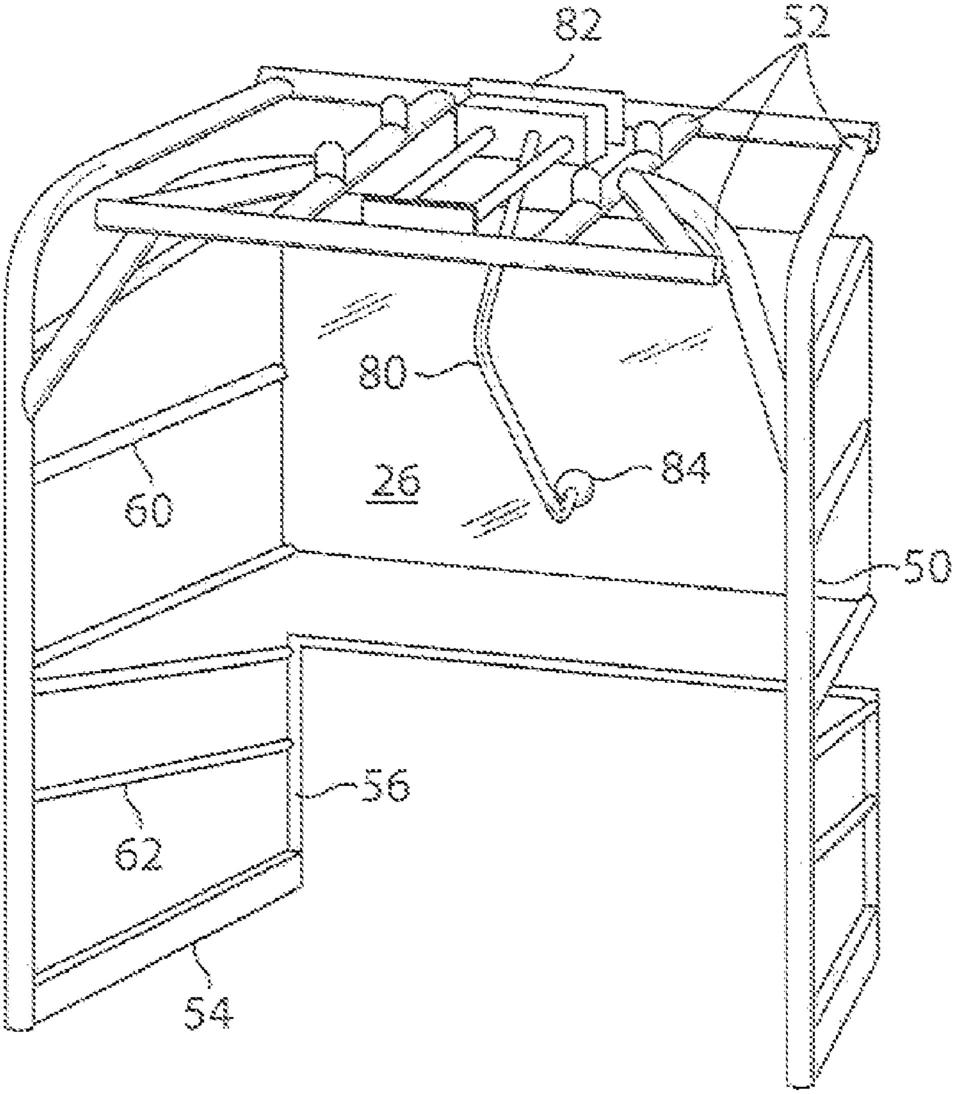
FIG. 3 is a perspective of the radiation protection system of the second embodiment shown in a collapsed configuration.

FIG. 2 illustrates an alternate embodiment of the frame 50 with the flexible panels 24 removed for clarity. The frame 50 of the alternative embodiment is similar to the frame 28 of the previous embodiment except that it folds for storage. The frame 50 includes hinges 52 which permit the frame to fold to a collapsed position as shown in FIG. 3 for storage. As further illustrated in FIG. 2, the frame 50 includes lower support rails 54 extending inward from the sides of the frame toward the table 34. The rails 54 extend inward to an inner frame 56 which extends over the table 34 and partially surrounds the patient as will be explained in further detail below. In one embodiment, one of the rails 54 and frame 56 are connected to the table 34 by a link 58 so the shield 22 moves with the table. Although the frame 50, rails 54, and inner frame 56 may be made of other materials without departing from the scope of the present invention, in one embodiment they are made from stainless steel tubing or another suitable material.

Telescoping rods or struts 60 extend between the frame 50 and the window 26. Additional telescoping rods or struts 62 extend between the frame 50 and the inner frame 56. Although different numbers of rods 60, 62 may be used without departing from the scope of the present invention, in one embodiment the shield 22 has six upper rods 60 and four lower rods 62 as shown. The flexible panels 24 are suspended from the rods 60, 62. Although the panels 24 may be made of other materials without departing from the scope of the present invention, in one embodiment the panels include lead sheets wrapped in vinyl covers. The panels 24 may be attached to the rods using any suitable fasteners such as hook and loop fasteners, screws, adhesives, zippers, or Velcro fasteners. Velcro is a federally registered trademark of Velcro Industries B.V. As will be appreciated by those skilled in the art, the flexible panels 24 and telescoping rods 60, 62 maintain radiation protection while providing flexibility to allow the shield 22 to conform to the needs of the medical personnel. The rods 60, 62 may include internal rotational and linear bearings or bushings (not shown) to reduce friction and decrease resistance to movement.

As further illustrated in FIG. 1, a flexible interface 70 is fastened across the inner frame 56 to cover an opening between the inner frame and patient. Lead blankets 72 are positioned over the patient. The interface 70 and lead blankets 72 reduce radiation from being transmitted to the medical personnel through the patient. A lead skirt 74 is fastened to the lower rail 54 of the frame 50 and to the table 34 to reduce radiation traveling beneath the shield 22 to the medical personnel. In one embodiment, the skirt 74 extends substantially to the floor. In one embodiment (not shown), the skirt 74 extends below the table 34. Although the interface 70, blankets 72 and skirt 74 may be made of other materials without departing from the scope of the present invention, in one embodiment they include lead sheets wrapped in vinyl covers similar to the construction of the panels 24. The interface 70, blankets 72 and skirt 74 may be attached to the shield 22 and each other using any suitable fasteners such as hook and loop fasteners, screws, adhesives, or Velcro fasteners. Thus, the system 20 provides a complete radiation barrier between the radiation source 36 and medical personnel, as well as between the patient and the medical personnel. The system 20 also blocks all other substantial secondary sources of radiation. In fact, it is believed that the system 20 can block more than 99% of all radiation that would otherwise reach the medical personnel, thereby eliminating the need for heavy protective clothing.

Figure 4:
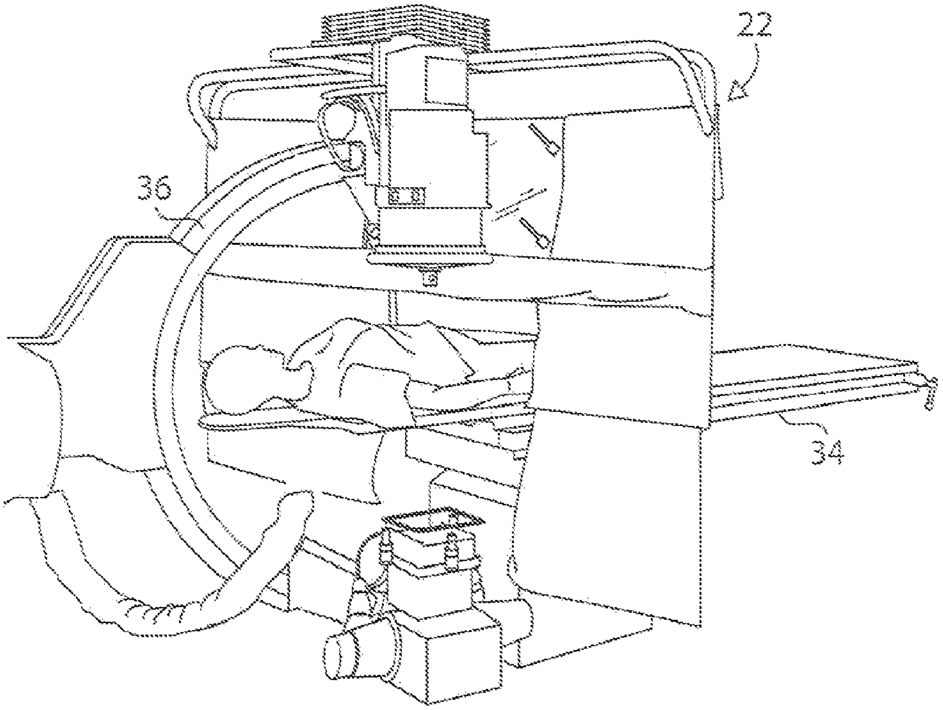
FIG. 4 is a perspective of the radiation protection system shown in FIG. 1 shown with a radiation source positioned for a patient groin shot.
Figure 5:
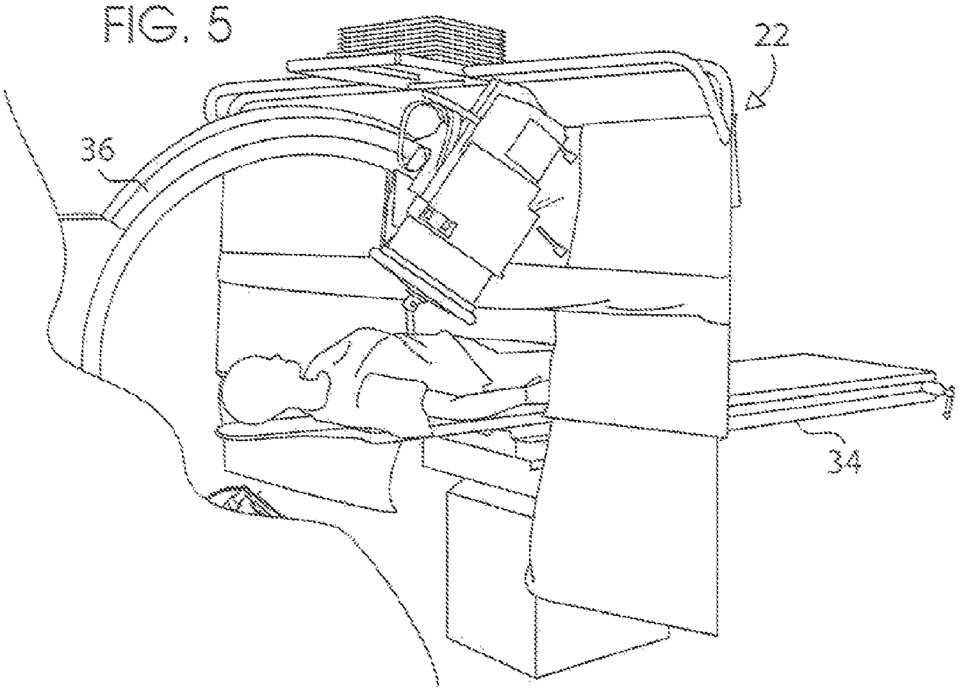
FIG. 5 is a perspective of the radiation protection system shown in FIG. 1 shown with a radiation source tilted caudal and laterally.
Figure 6:
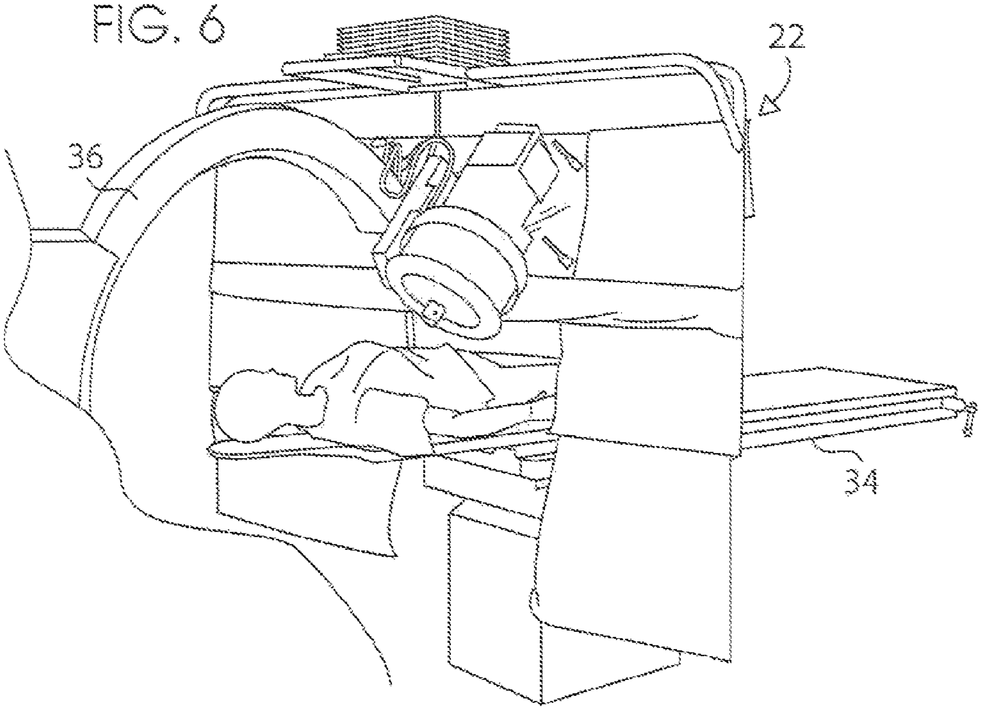
FIG. 6 is a perspective of the radiation protection system shown in FIG. 1 shown with a radiation source tilted caudal.

As further illustrated in FIG. 2, the inner frame 56 is pivotally mounted on the rails 54 and the ends of the rods 62 are pivotally mounted on the frame 50 and the inner frame so the inner frame is free to pivot about the rails. The window 24 is suspended from a support 80 mounted on linear bearings 82 mounted on the frame 50. The window 24 is connected to the support 80 by a ball joint 84 and the rods 60 are pivotally mounted on the frame 50 and the window so the window is free to tilt in all directions within the frame. Although the window support 80 may be made of other materials without departing from the scope of the present invention, in one embodiment it is made from stainless steel tubing or another suitable material. Although the window 24 may be made of other materials without departing from the scope of the present invention, in one embodiment it is made from a leaded acrylic having low radiation transmissivity. The flexibility of the panels 24 and rods 60, 62 as well as the pivoting window 26 and tilting inner frame 56 permit the shield 22 to accommodate large excursions of the radiation source 36 that are required for viewing specific parts of the patient and to prevent damaging the source and equipment 38 if collisions occur. For example, the flexibility of the shield 22 permits the table 34 and source 36 to be positioned for a patient groin shot as shown in FIG. 4, to be positioned so the source is tilted 45 degrees caudal and 45 degrees laterally as shown in FIG. 5, or to be positioned so the source is tilted 45 degrees caudal as shown in FIG. 6. In each case, the shield 22 bends out of plane to accommodate the movements of the table 34 and source 36 without unnecessary encroaching into the space where medical personnel stand.

Figure 7:
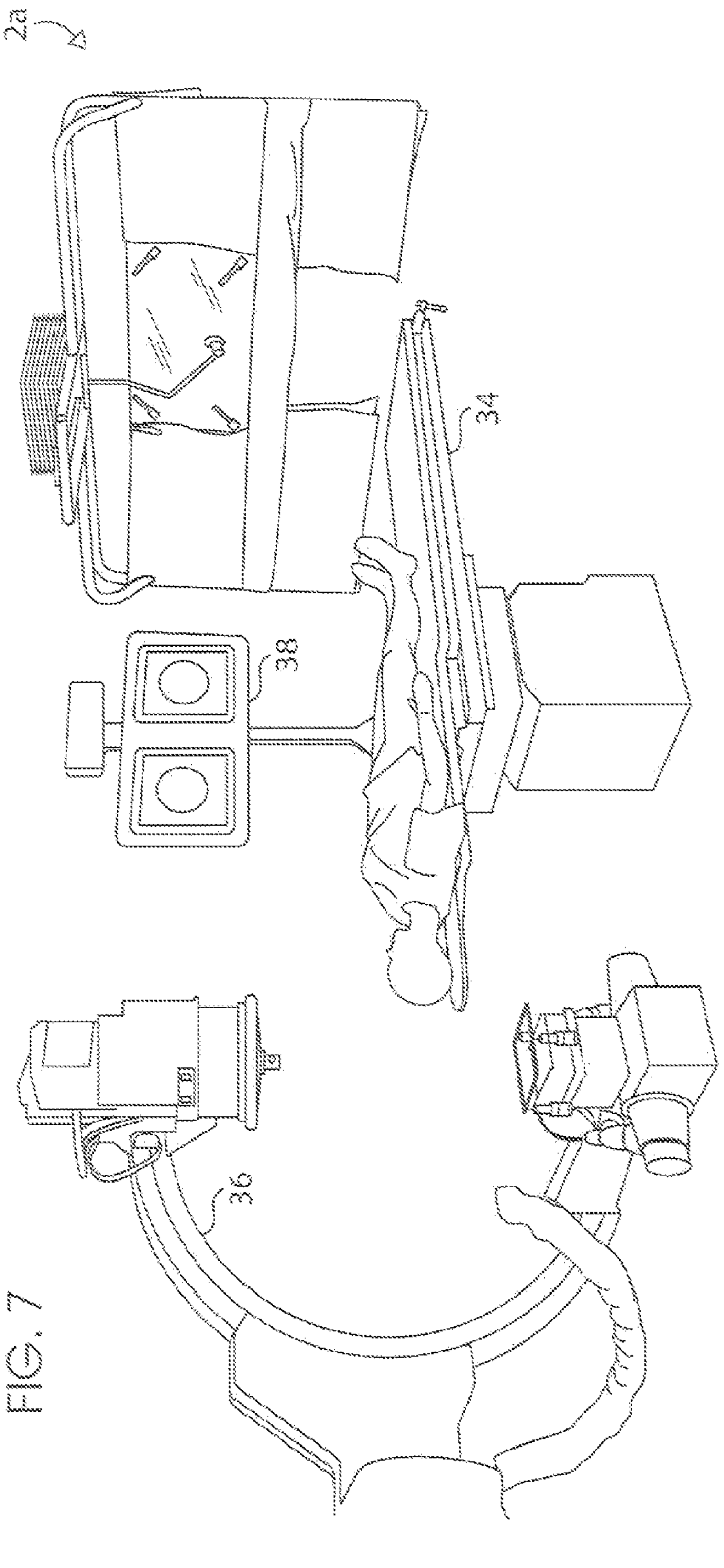
FIG. 7 is an alternate perspective of the radiation protection system shown in FIG. 1 with the system stored away from other equipment.

As illustrated in FIG. 1, the lift 30 is slidably mounted on a carriage 90 which is mounted on a bridge 92 that is slidably suspended between the overhead track 32. The carriage 90 and bridge 92 form an x-y stage which permits the left 30 to be positioned anywhere within an area defined by the track 32. For example, the system 20 may be moved concurrent with the table 34 or it may be moved to a position remote from the table, source 36 and equipment 38 as shown FIG. 7 to permit the radiographic equipment to be used without the system 20 or to permit the patient to be positioned onto and removed from the table. The carriage 90 and bridge 92 may include bearings to reduce friction and decrease resistance to movement. Moreover, it is envisioned that the carriage 90 and bridge 92 may be motorized to further increase the ease with which they are moved. Further, the carriage 90 and bridge 92, as well as other moving components, may include brakes or detents for maintaining relative positions.

Figure 8:
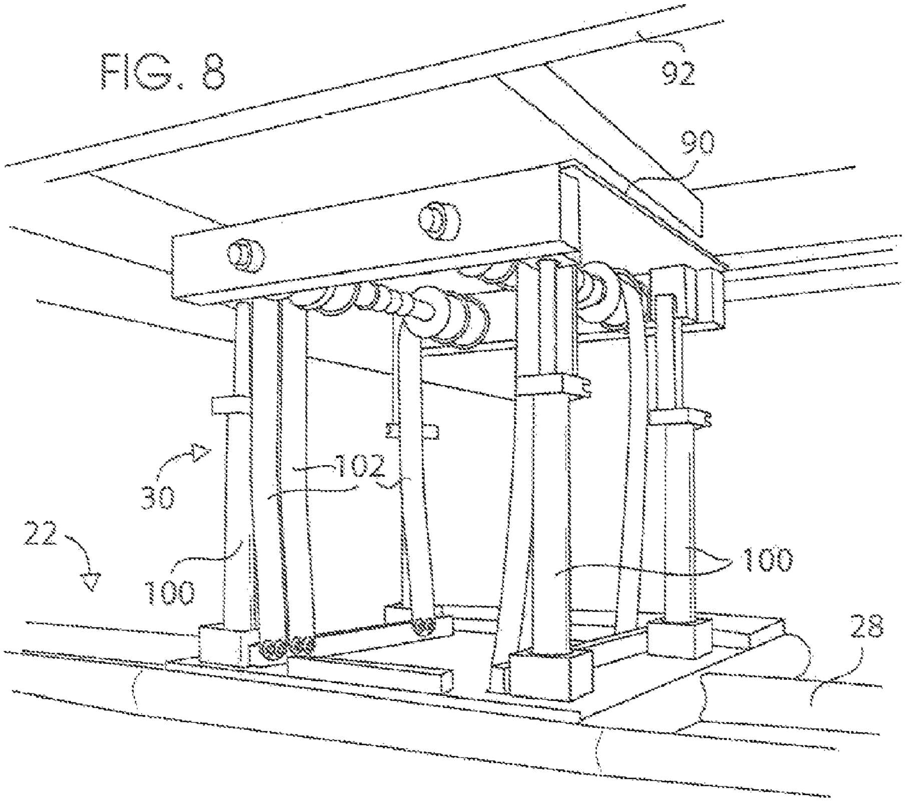
FIG. 8 is a perspective of a lift of the first embodiment.
Figure 9:
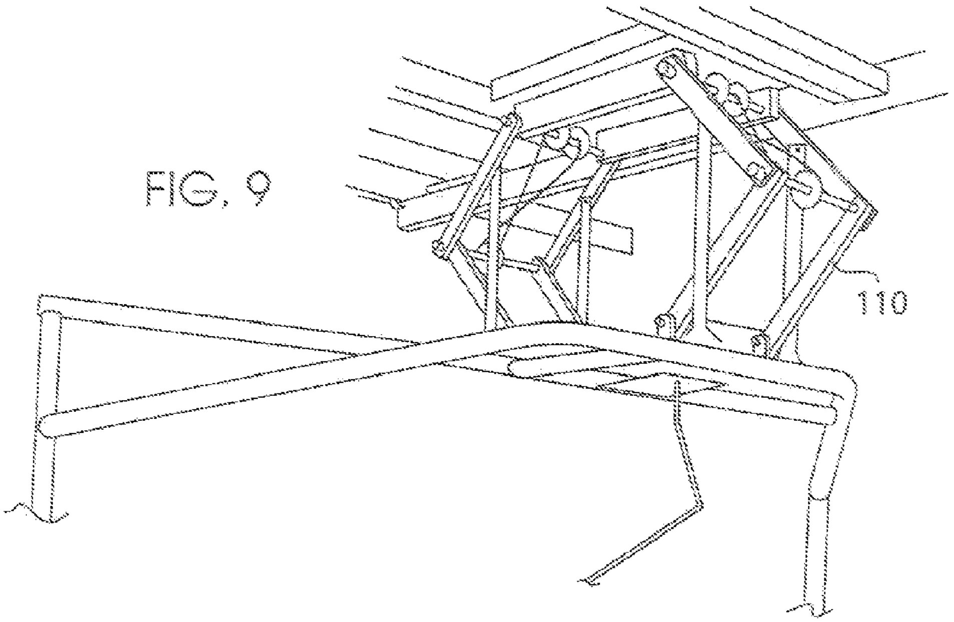
FIG. 9 is a perspective of a lift of an alternative embodiment.

A bellows 94 covers the lift 30. FIG. 8 illustrates one embodiment of the lift with the bellows 94 removed. In this embodiment, the lift 30 includes linear bearings 100 mounted between the frame 28 and the carriage 90. The lift 30 includes springs 102 biasing the shield 22 upward to neutralize its weights so that it may be easily lifted upward and away from the table 34. In one embodiment, the lift 30 has a slight upward force balance so the weight of the shield 22 is not borne by the table 34. In an alternate embodiment shown in FIG. 9, the linear bearings are replaced with a scissors mechanism 110.

Figure 10:
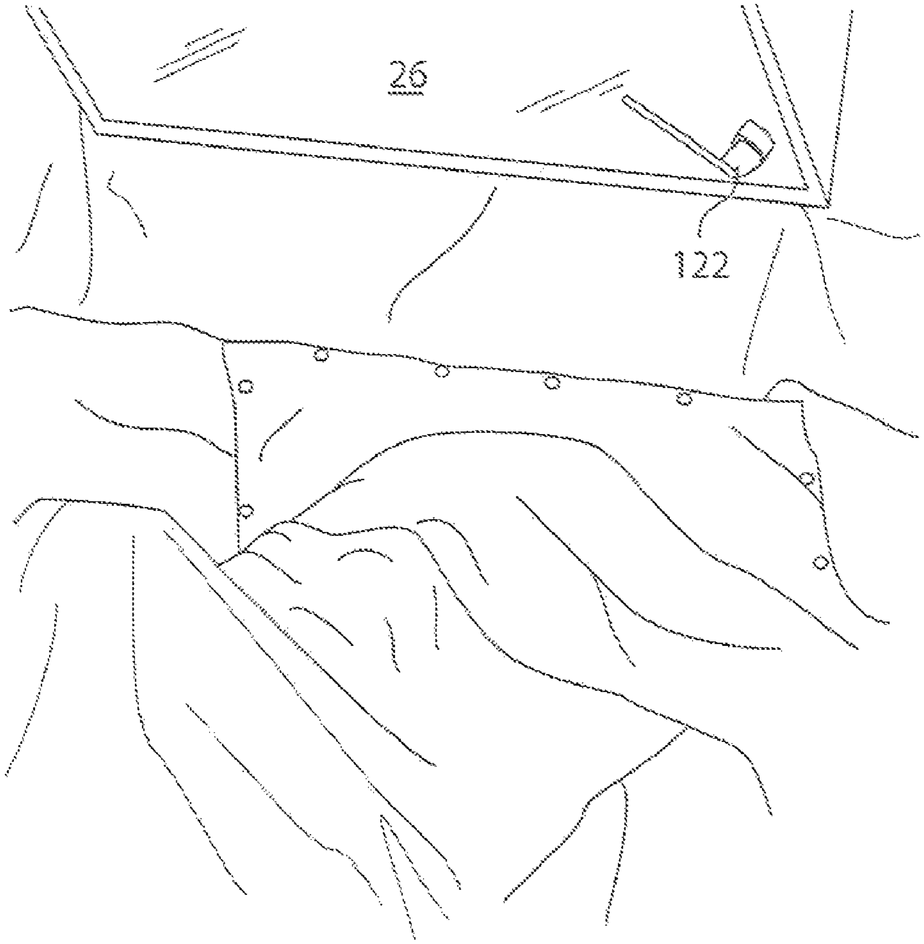
FIG. 10 is a detail of the system shown in FIG. 1.

FIG. 10 illustrates one embodiment of the fasteners 120 used to connect the interface 70 to the inner frame 56. As further illustrated in FIG. 10, the inner frame 56 and the window 26 may include handles 122 allowing medical personnel to grasp the window and inner frame to position these elements more easily. FIG. 10 also shows openings 124 in one embodiment of the blanket 72 for allowing access to the patient while minimizing radiation exposure to medical personnel. The openings 124 may be covered by inserts (not shown) having smaller apertures to further reduce radiation exposure.

Figure 11:
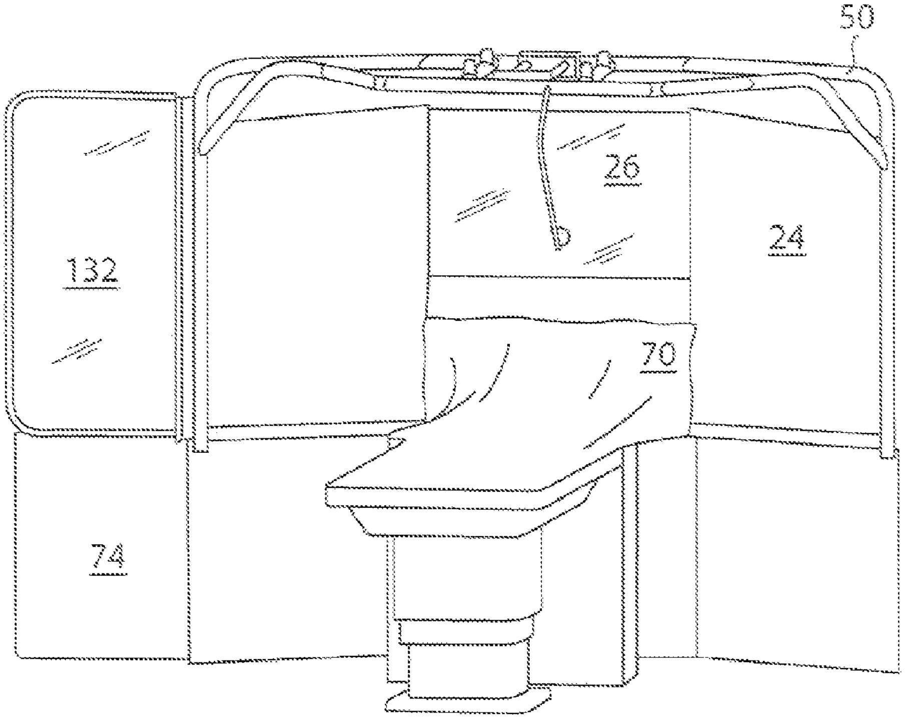
FIG. 11 is a perspective of a system of a third embodiment.

In an alternate embodiment shown in FIG. 11, the frame 50 includes a pivoting wing 130 having a visually transparent window 132 for permitting the medical personnel to view the patient's upper body and the radiation source 36 without exposing the medical personnel to radiation. Although the window 132 may be made of other materials without departing from the scope of the present invention, in one embodiment it is made from a leaded acrylic having low radiation transmissivity. In this embodiment, the skirt 74 may extend below the window 132 to reduce radiation exposure.

In some embodiments, the shield 22 may include a cover 140 between the window 26 and adjoining the panels 24 to increase the flexibility of the shield while reducing radiation leaks at the interface between the window and panels. One embodiment of the cover 140 is shown in FIG. 1.

Figure 12:
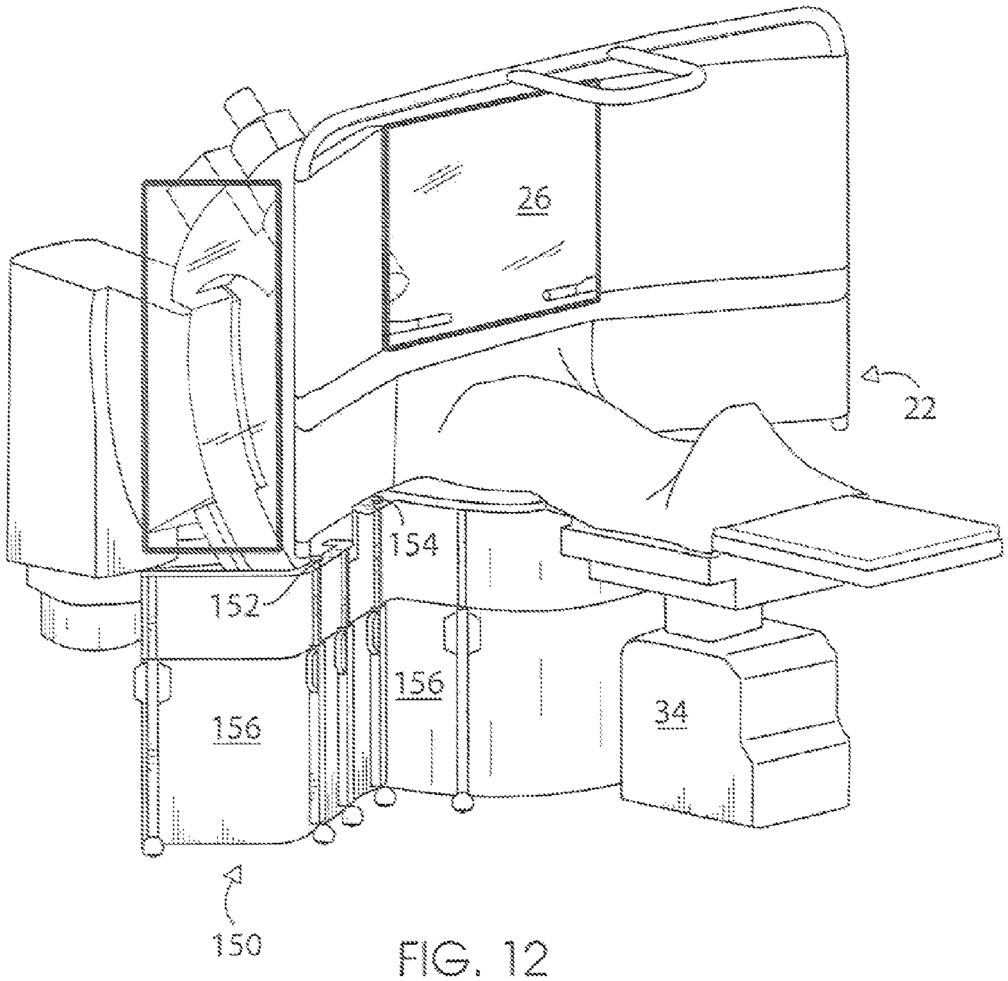
FIG. 12 is a perspective of a system of a fourth embodiment.

Another embodiment shown in FIG. 12 is similar to that shown in FIG. 11 but includes a lower shield assembly, generally designated by 150, that connects to a lower edge of the shield 22. The lower shield assembly 150 includes casters 152 for support the lower assembly and permitting it to move more easily with the shield. Further, in one embodiment the lower assembly 150 may include hinges 152, 154 and telescoping panels 156 so the lower assembly can expand horizontally with the shield and vertically with the table 34 to prevent gapping. As will also be evident in FIG. 12, the support 80, bearings 82, and ball joint 84 may be eliminated in some embodiments. This is accomplished by increasing the strength of some of the this struts 60 so they are capable of carrying the load of the window 26. As suitable ways of providing the additional strength are well known to those skilled in the art, they will not be described in further detail.

A video camera and audio intercom (not shown) may be mounted on the frame to permit patient communication and observation.

As will be appreciated by those skilled in the art, the systems described above may be included in new radiographic labs or retrofitted to existing labs.

A document is attached hereto as an appendix and is incorporated by reference in its entirely.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A radiation protection system for protecting medical personnel from radiation being applied from a radiation source to a patient positioned on a table, the system comprising:

a shield for positioning above the table including:

an inner frame sized and shaped for receiving the patient when the patient is positioned on the table;

a plurality of rods extending outward from the inner frame;

an outer frame surrounding said inner frame and connected to said plurality of rods; and a radiopaque flexible panel attached to said rods.

2. A radiation system as set forth in claim 1 wherein said flexible panel includes lead.

3. A radiation system as set forth in claim 2 wherein said flexible panel includes lead sheets wrapped in a vinyl cover.

4. A radiation system as set forth in claim 1 wherein the shield includes a plurality of flexible panels attached to said plurality of rods.

5. A radiation system as set forth in claim 1 further including a visually transparent and radiopaque window attached to the outer frame by said plurality of rods.

6. A radiation system as set forth in claim 5 wherein said window includes a lead-impregnated acrylic.

7. A radiation system as set forth in claim 1 further including a track mounted on a ceiling of an area in which the system is positioned and a lift connected to the outer frame of the shield and said track.

8. A radiation system as set forth in claim 7 wherein the lift is movably connected to the track allowing selective movement of the shield about the area in which the system is positioned.

9. A radiation system as set forth in claim 7 wherein said lift includes covering bellows.

10. A radiation system as set forth in claim 7 wherein said lift further includes a carriage mounted on said track and linear bearings mounted between the frame and the carriage.

11. A radiation system as set forth in claim 7 wherein said lift further includes springs biasing the shield toward the ceiling.

12. A radiation system as set forth in claim 7 wherein said lift further includes a scissor mechanism and the shield is raised and lowered by opening and closing the mechanism.

13. A radiation system as set forth in claim 1 wherein said outer frame includes hinges allowing the shield to fold to a collapsed position for storage of the shield.

14. A radiation system as set forth in claim 1 wherein the outer frame, the plurality of rods, and the inner frame are made from stainless steel tubing.

15. A radiation system as set forth in claim 1 wherein said plurality of rods are telescopic to allow relative movement between the outer frame and the inner frame.

16. A radiation system as set forth in claim 5 wherein each of said plurality of rods includes internal rotational and linear bearings or bushings.

17. A radiation system as set forth in claim 5 wherein said plurality of rods are telescopic to allow relative movement between the outer frame and said window.

18. A radiation system as set forth in claim 5 wherein said plurality of rods include six upper rods connecting the outer frame to said window and four lower rods connecting said outer frame to the inner frame.

19. A radiation system as set forth in claim 1 wherein said plurality of panels are suspended from said plurality of rods.

20. A radiation system as set forth in claim 19 wherein said plurality of panels are attached to said rods using a fastener selected from a group of fasteners consisting of a hook and loop fastener, a Velcro fastener, a screw fastener, a snap fastener, and an adhesive.

21. A radiation system as set forth in claim 1 further comprising a flexible radiopaque interface attached to the inner frame to cover an opening between the inner frame and the patient during use of the system.

22. A radiation system as set forth in claim 1 further comprising a radiopaque blanket for positioning between the patient and the medical personnel during use of the system.

23. A radiation system as set forth in claim 1 wherein the shield further includes lower rails extending between the outer frame and the inner frame and the system further includes a radiopaque skirt attached to said lower rails.

24. A radiation system as set forth in claim 23 wherein said skirt is configured for attaching to the table and attached to the table during use of the system.

25. A radiation system as set forth in claim 23 wherein said skirt extends substantially to a floor of an area in which the system is positioned.

26. A radiation system as set forth in claim 23 wherein said skirt extends beneath the table.

27. A radiation system as set forth in claim 23 wherein said skirt includes lead.

28. A radiation system as set forth in claim 23 wherein said skirt includes lead sheets wrapped in vinyl covers.

29. A radiation system as set forth in claim 22 wherein said blanket includes lead sheets wrapped in vinyl covers.

30. A radiation system as set forth in claim 21 wherein said interface includes lead sheets wrapped in vinyl covers.

31. A radiation system as set forth in claim 23 wherein said skirt is attached to the lower rails by a fastener selected from a group of fasteners consisting of a hook and loop fastener, a Velcro fastener, a screw fastener, a snap fastener, and an adhesive.

32. A radiation system as set forth in claim 21 wherein said interface is attached to the inner frame by a fastener selected from a group of fasteners consisting of a hook and loop fastener, a Velcro fastener, a screw fastener, a snap fastener, and an adhesive.

33. A radiation system as set forth in claim 1 wherein the shield further includes lower rails pivotally connected to the outer frame and pivotally connected to the inner frame and ends of the plurality of rods are pivotally mounted on the outer frame and the inner frame so the inner frame is free to pivot about the rails.

34. A radiation system as set forth in claim 5 further including a lift connected to said outer frame and a support connecting the window and said lift.

35. A radiation system as set forth in claim 34 wherein the support is mounted on linear bearings mounted on said frame.

36. A radiation system as set forth in claim 34 wherein the window is attached to the support by a ball joint.

37. A radiation system as set forth in claim 34 wherein the support is made from stainless steel tubing.

38. A radiation system as set forth in claim 10 further including a bridge slidably connected to said track, wherein said track is fixedly connected to a ceiling of an area in which the system is positioned and the carriage is slidably mounted on said bridge.

39. A radiation system as set forth in claim 38 wherein said carriage and bridge form an x/y-direction stage permitting the lift to be positioned anywhere within an area defined by the track.

40. A radiation system as set forth in claim 38 further including a motor connected to the carriage and the bridge for controlling movement of the shield.

41. A radiation system as set forth in claim 38 further including brakes or detents connected to said carriage and bridge for maintaining relative positions of the carriage and bridge.

42. A radiation system as set forth in claim 5 wherein said window and said inner frame include a handle for grasping by medical personnel for facilitating positioning of the window and inner frame.

43. A radiation system as set forth in claim 22 wherein said blanket includes an opening for allowing access to the patient by medical personnel while minimizing radiation exposure to the personnel.

44. A radiation system as set forth in claim 43 further including an insert covering said opening to further reduce radiation exposure to the personnel.

45. A radiation system as set forth in claim 1 further including a visually transparent and radiopaque wing panel connected to the outer frame.

46. A radiation system as set forth in claim 45 wherein said wing panel is pivotally connected to the outer frame.

47. A radiation system as set forth in claim 1 further including a radiopaque wing panel pivotally connected to the outer frame.

48. A radiation system as set forth in claim 47 wherein said wing panel is visually transparent.

49. A radiation system as set forth in claim 45 wherein said wing panel includes a lead-impregnated acrylic.

50. A radiation system as set forth in claim 47 wherein said wing panel includes a lead-impregnated acrylic.

51. A radiation system as set forth in claim 5 further including a cover connected between the window and said panel adjacent the window for blocking radiation from emitting between the window and the panel.

52. A radiation system as set forth in claim 22 further including disposable sheets positioned over and/or under said blanket during use of the system.

* * * * *